United States Patent
Best et al.

(10) Patent No.: US 7,474,853 B2
(45) Date of Patent: *Jan. 6, 2009

(54) NON-BLOCKING ALL-OPTICAL SWITCHING NETWORK DYNAMIC DATA SCHEDULING SYSTEM AND IMPLEMENTATION METHOD

(75) Inventors: Robert E. Best, Richardson, TX (US); Ramaswamy Chandrasekaran, Plano, TX (US); John R. Rudin, III, Dallas, TX (US); Rose Q. Hu, Plano, TX (US); Jeff L. Watson, Dallas, TX (US); Lakshman S. Tamil, Plano, TX (US); Alessandro Fabbri, Richardson, TX (US)

(73) Assignee: YT Networks Capital, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/299,889

(22) Filed: Dec. 12, 2005

(65) Prior Publication Data

US 2006/0092937 A1 May 4, 2006

Related U.S. Application Data

(63) Continuation of application No. 10/063,301, filed on Apr. 9, 2002, now Pat. No. 7,190,900.

(60) Provisional application No. 60/306,954, filed on Jul. 20, 2001.

(51) Int. Cl.
*H04J 14/00* (2006.01)
(52) U.S. Cl. .............................. 398/51; 398/54; 398/75
(58) Field of Classification Search ............... 370/229, 370/235, 400; 398/54, 102, 75, 51
See application file for complete search history.

(56) References Cited

U.S. PATENT DOCUMENTS

| 5,416,769 | A | 5/1995 | Karol |
| 5,469,284 | A | 11/1995 | Haas |
| 5,486,943 | A | 1/1996 | Sasayama et al. |
| 5,734,486 | A | 3/1998 | Guillemot et al. |
| 5,737,106 | A | 4/1998 | Sansonetti et al. |
| 6,160,812 | A | 12/2000 | Bauman et al. |

(Continued)

OTHER PUBLICATIONS

G. Depovere et al., Phillips Research Laboratories, "*A Flexible Cross-Connect Network Using Multiple Object Carriers*,", Date Unknown, All pages.

(Continued)

*Primary Examiner*—Dalzid Singh
(74) *Attorney, Agent, or Firm*—Connolly Bove Lodge & Hutz LLP

(57) ABSTRACT

A non-blocking optical matrix core switching method that includes maintaining a schedule for routing data through an optical matrix core and receiving and analyzing reports from peripheral devices. The method determines whether the schedule is adequate for the current data traffic patterns and if the schedule is not adequate a new schedule is implemented. The new schedule is then transferred to the peripheral devices for implementation and the new schedule is transferred to the optical matrix core scheduler. Implementation of the new schedule as the schedule on the peripheral devices and the optical matrix core scheduler is then performed.

12 Claims, 10 Drawing Sheets

U.S. PATENT DOCUMENTS

| | | | |
|---|---|---|---|
| 6,304,552 | B1 | 10/2001 | Chapman et al. |
| 6,345,040 | B1* | 2/2002 | Stephens et al. ............ 370/232 |
| 6,477,169 | B1 | 11/2002 | Angle et al. |
| 6,658,579 | B1 | 12/2003 | Bell et al. |
| 6,665,495 | B1* | 12/2003 | Miles et al. .................... 398/54 |
| 6,747,971 | B1 | 6/2004 | Hughes et al. |
| 6,876,649 | B1* | 4/2005 | Beshai ........................ 370/355 |
| 6,907,002 | B2* | 6/2005 | Beshai et al. ................ 370/230 |
| 7,023,840 | B2* | 4/2006 | Golla et al. .................. 370/360 |
| 7,023,841 | B2 | 4/2006 | Dell et al. |
| 7,106,697 | B1 | 9/2006 | Best et al. |
| 2002/0029238 | A1* | 3/2002 | Okuhata ..................... 709/101 |
| 2003/0067653 | A1* | 4/2003 | Aicklen et al. .............. 359/139 |
| 2005/0276263 | A1 | 12/2005 | Suetsugu et al. |

OTHER PUBLICATIONS

John M. Senior et al., SPIE—The International Society for Optical Engineering, *All-Optical Networking 1999: Architecture, Control, and Management Issues*, vol. 3843, pp. 111-119, dated Sep. 19-21, 1999.

Jonathan S. Turner, Journal of High Speed Networks 8 (1999) 3-16 IOS Press, "Terabit Burst Switching," pp. 3-16.

Ken-ichi Sato, IEEE Journal on Selected Areas in Communications, vol. 12, No. 1, Jan. 1994, "*Network Performance and Integrity Enhancement with Optical Path Layer Technologies*," pp. 159-170.

F. Callegati et al., Optical Fiber Technology 4, 1998, "*Architecture and Performance of a Broadcast and Select Photonic Switch*," pp. 266-184.

Soeren Lykke Danielsen et al., "*WDM Packet Switch Architectures and Analysis of the Influence of Tuneable Wavelength Converters on the Performance*".

Soeren L. Danielsen et al. IEEE Photonics Technology Letters, vol. 10, No. 6, Jun. 1998, "*Optical Packet Switched Network Layer Without Optical Buffers*".

John M. Senior et al., SPIE-The International Society of Optical Engineering, "*All-Optical Networking: Architecture, Control and Management Issues*," dated Nov. 3-5, 1998, vol. 3531, pp. 455-464.

M.C. Chia et al., Part of SPIE Conference on All-Optical Networking: Architecture, Control and Management Issues, Nov. 1998, "*Performance of Feedback and Feedforward Arrayed-Waveguide Gratings-Based Optical Packet Switches with WDM Inputs/Outputs*".

Wu et al, Simulation-based test algorithm generation and port scheduling for multi-port memories, AMC Press, Proceedings of the 38th conference on Design automation, pp. 301-306, Jun. 2001.

Mattson et al, Communication Scheduling, AMC Press, ACM Sigarch Computer Architecture News, ACM Sigops Operating Systems Review, Proceedings of the ninth international conference on Architectural support for programming languages and operating systems ASPLOS-IX, vol. 28, 34 issue 5, 5, pp. 82-92, Nov. 2000.

McKeown et al., Designing and Implementing a Fast Crossbar Scheduler, IEEE, pp. 20-28, 1999.

\* cited by examiner

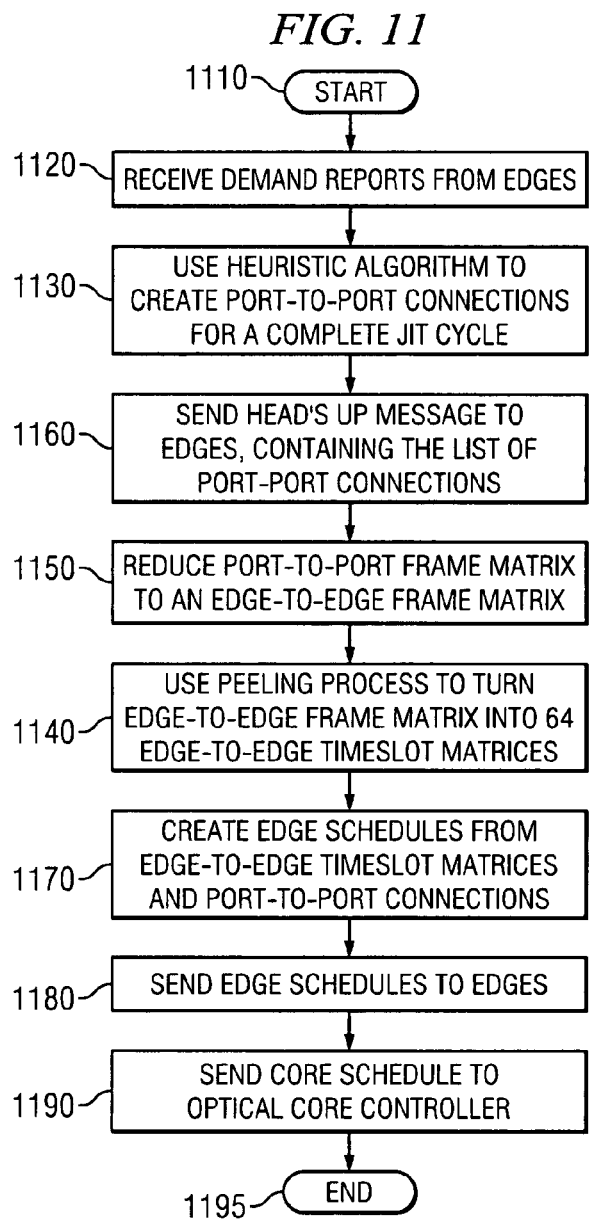
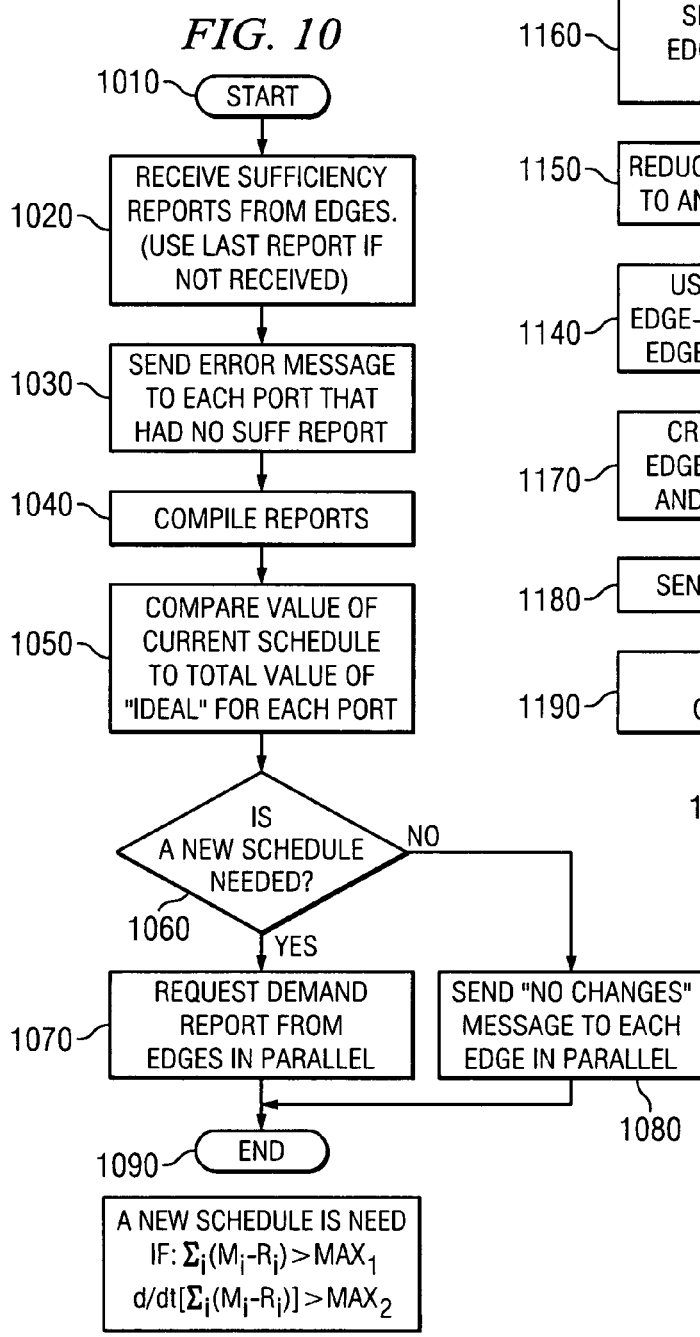

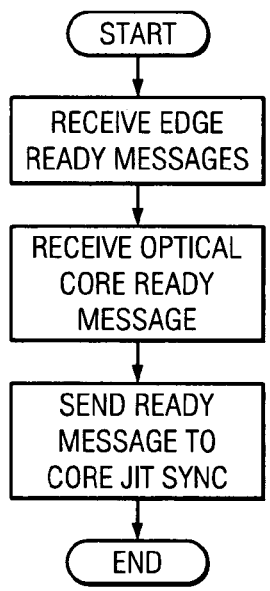
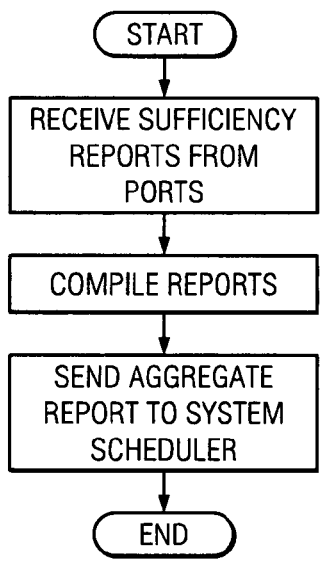
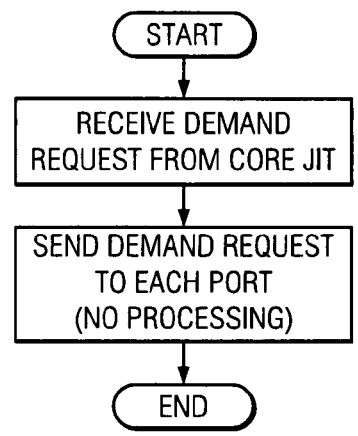
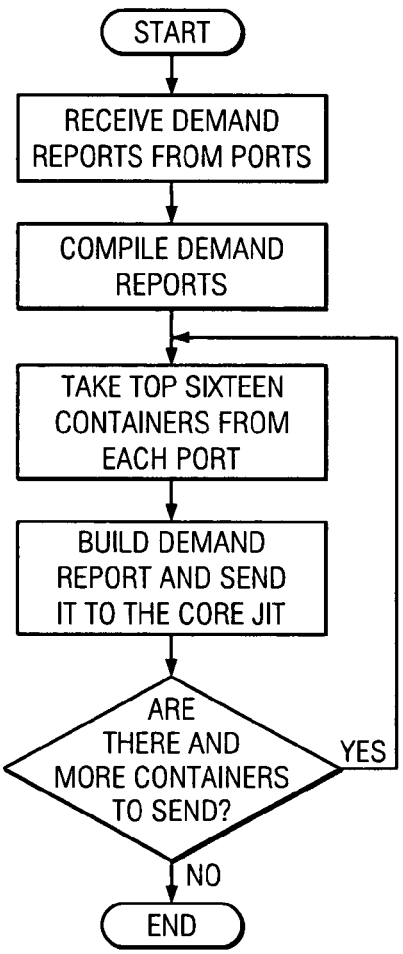
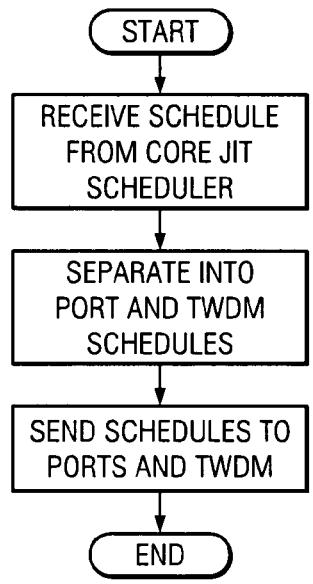

NON-BLOCKING ALL-OPTICAL SWITCHING NETWORK DYNAMIC DATA SCHEDULING SYSTEM AND IMPLEMENTATION METHOD

CROSS-REFERENCE TO RELATED APPLICATION

This application is a continuation of, and claims a benefit of priority under 35 U.S.C 120 of the filing date of U.S. patent application Ser. No. 10/063,301 by inventor Robert E. Best entitled "System and Method for Implementing Dynamic Scheduling of Data in a Non-Blocking All-Optical Switching Network filed on Apr. 9, 2002, which in turn claims priority under 35 U.S.C. 119 to U.S. Provisional Application No. 60/306,954 filed Jul. 20, 2001 by inventors Alessandro Fabbri, John R. Rudin, Jeff L. Watson, Lakshman S. Tamil, Robert E. Best, Ramaswamy Chandnasekarn, and Rose Q. Hu, each of which is hereby expressly incorporated by reference for all purposes.

BACKGROUND OF INVENTION

1. Field of the Invention

The present invention relates to all-optical switching networks and more particularly to a non-blocking all-optical switching network employing a dynamic scheduling algorithm.

2. Description of the Related Art

One problem inherent in high-bandwidth switching is that switching itself introduces and becomes a bottleneck in the data transfer process for TDM (Time Division Multiplexing) or packet traffic. For instance, in a switch with 4096 ports, there are 4096×4096=16,777,216 possible port-to-port connections and a very high potential for blocking. Based on current technology it is virtually impossible to have all of these connections available at once.

The conventional solution to this problem is to establish a closed network, which is a non-blocking static link system that models the behavior of the incoming traffic, and forms a non-blocking static link system that maximizes the throughput by minimizing the amount of time an established link has no traffic to send. A major disadvantage of this system is that it does not adjust for the current traffic queues (i.e. patterns). Typically a one-time solution (i.e. statistical model) is employed via empirical tests to resolve any blocking issues. The solution of course will not be the optimal solution in all instances, but provides a practical response to blocking situations that do occur.

If the traffic the switch encounters deviates appreciably from the assumed distribution implemented by the chosen solution, traffic can be left waiting at the optical switch for prolonged periods even if the switch is not operating at capacity. This is a severe limitation inherent in static statistical models. What is needed is a system and method for dynamically recalculating a solution and dynamically setting and re-setting switch paths based on the current environment of the network and switch capacity.

SUMMARY OF INVENTION

The present invention has been made in view of the above circumstances and has as an aspect a non-blocking optical matrix core switching method, the method including maintaining a schedule for routing data through an optical matrix core.

A further aspect of the present invention includes a non-blocking optical matrix core switching system, the system including an optical matrix core for routing data packets without blocking.

Additional aspects and advantages of the invention are set forth in part in the description which follows, and in part are obvious from the description, or may be learned by practice of the invention. The aspects and advantages of the invention is realized and attained by means of the elements and combinations particularly pointed out in the appended claims.

To achieve these and other advantages and in accordance with the purpose of the present invention, as embodied and broadly described, the present invention can be characterized according to one aspect the invention as including a non-blocking optical matrix core switching method, the method including maintaining a schedule for routing data through an optical matrix core and receiving and analyzing reports from peripheral devices. The method determines whether the schedule is adequate for the data traffic patterns, wherein if the schedule is not adequate a new s schedule is implemented. The new schedule is then transferred to the peripheral devices for implementation and the new schedule is transferred to the optical matrix. Implementation of the new schedule as the schedule on the peripheral devices and the optical matrix core scheduler is then performed.

The present invention can be further characterized according to another aspect the invention as including a non-blocking optical matrix core switching system, the system including an optical matrix core for routing data packets, wherein the switch fabric is capable of performing the steps of managing a schedule for routing data packets through the optical matrix core without blocking. The optical matrix is capable of also receiving and analyzing port reports and determining whether the schedule is adequate for the current data packet traffic patterns, wherein if the schedule is not adequate a replacement schedule is acquired. The replacement schedule is transferred to the ports for implementation and implementation of the replacement schedule as the current schedule on the ports is performed.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate several embodiments of the invention and together with the description, serve to explain the principles on of the invention.

FIG. 10 is a flow diagram for a sufficiency decision of the JIT scheduler;

FIG. 11 is a flow diagram of a core scheduler calculation of the present invention;

FIG. 12 is a schedule change coordination flow diagram;

FIG. 13 is an edge sufficiency report flow diagram of one embodiment of the present invention;

FIG. 14 is an edge demand request compilation flow diagram of one embodiment of the present invention;

FIG. 15 is a flow diagram of schedule dissemination to ports and TWDM of the present invention;

FIG. 16 is an edge sufficiency report flow diagram of one embodiment of the present invention;

DETAILED DESCRIPTION

A preferred embodiment of the invention is described below. It should be noted that this and any other embodiments described below are exemplary and are intended to be illustrative of the invention rather than limiting.

To meet the blocking and delay requirements of a complex core router/cross connect network, the present invention proposes a scheduler for allocating network resources to flows and connections. This is achieved with no edge blocking, and no link blocking.

Traffic blocking in routing systems depends on two blocking components. The first blocking component is defined as blocking at the link level. In a non-blocking crossbar network, the link level blocking is eliminated because of the non-blocking nature of the matrix. In addition to the link level blocking, there is also edge level blocking. Edge level blocking occurs when multiple ingress edges try to reach the same egress edge at the same time. In the event a loss type system is employed system blocking results in packets being lost. The routing system of the present invention employs a delay system with packets waiting at the ingress queue, thus packets will not be lost due to edge level blocking.

The scheduler design of the present invention allocates core optical switch fabric resources so that blocking will not cause significant impact on delay and jitter performance of the system. The edge blocking elimination in the present invention depends on the traffic dispersion capability of a routing algorithm employed by the present invention. Different routing and trunking algorithms can reduce the edge blocking and consequently produce less delay and jitter in a system. A system employing very high capacity routes to reduce the number of hops may also create the opportunity for multi-link trunking operations. The scheduler design of the present invention is capable of taking advantage of trunking to reduce blocking.

Figure 1:
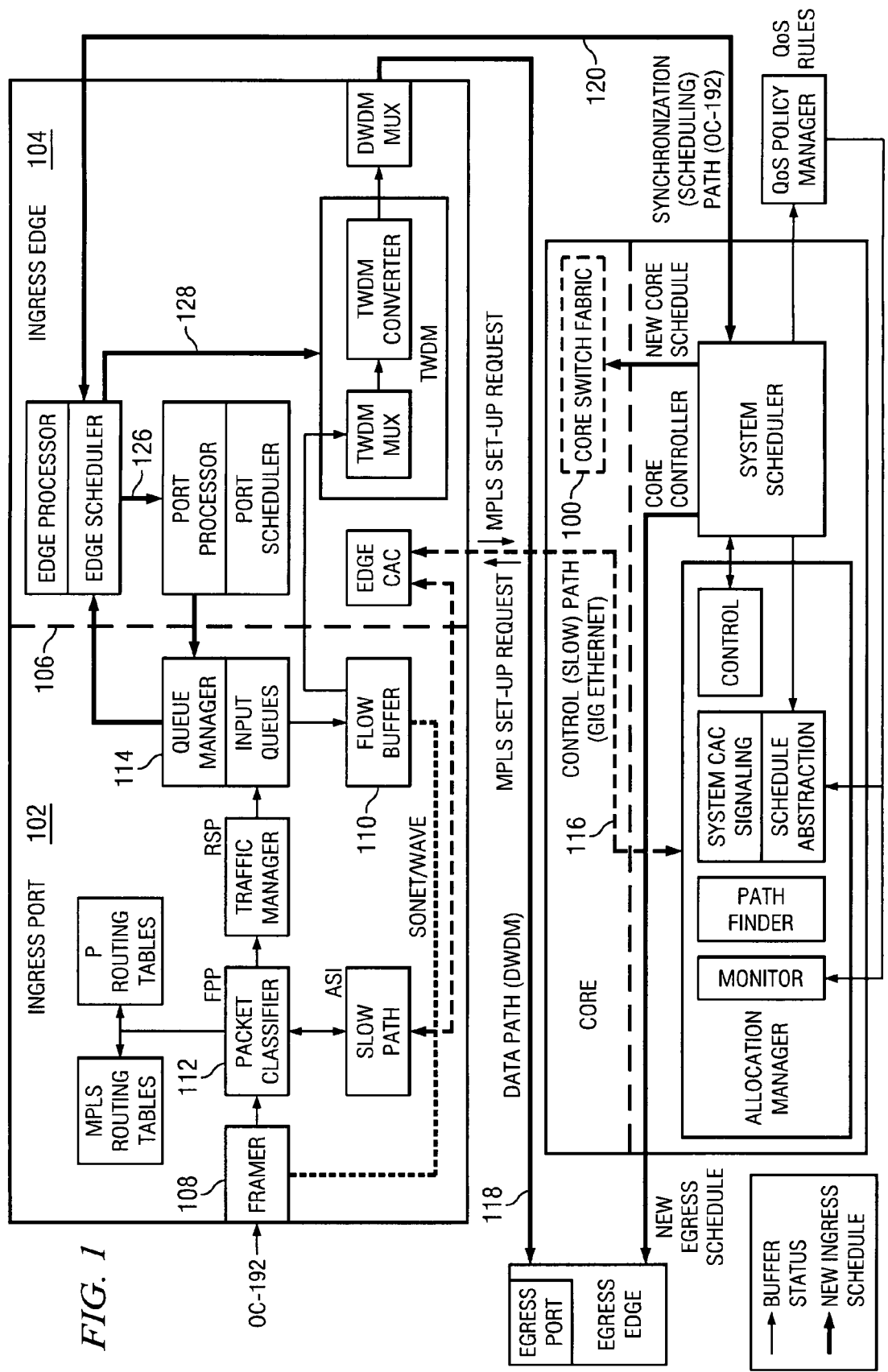
FIG. 1 is a schematic diagram of the architecture of one embodiment of the present invention.

FIG. 1 presents a schematic overview of a network scheduling process architecture of the present invention comprises a core router 100 and one or more edges. Each edge has one or more port cards. Each edge and each port have both ingress and egress functionality (i.e. there are not separate ingress and egress edges). An ingress port 102 is separated from the ingress edge 104 that hosts it, schematically, by a heavy dashed line 106. The same ingress edge is capable of hosting several ports.

The present invention supports both TDM (Time Division Multiplexing) traffic and packet traffic (Packet Over SONET PoS). A port card that supports packet traffic id assumed to support four different qualities of service for the core router 100 (MPLS, DiffServ 1 (DS-1), DiffServ 2 (DS-2), and Best Efforts (BE)). Though TDM and packet traffic are not both supported on the same port card at present, the present invention demonstrates the different paths that could be taken by the different types of traffic. As shown in FIG. 1, TDM (SONET/WAVE) traffic is detected at the framer 108 and is routed directly to the flow buffers 110 for transport through the core router 100, wherein there are minimal delays for queuing. Packet traffic on the other hand is directed to the packet classifier 112 that determines the path through core router 100. The packet is then placed into an appropriate input queue 114 to await scheduling.

FIG. 1 further displays three potential paths for connecting the various edges to the core router 100. First the control path 116 (also referred to as the "slow path") carries control messages to and from the core router control complex. This will normally be a LAN or similar type network controlled by a gigabit Ethernet switch. The data path 118 carries the actual traffic over a DWDM (Dense Wavelength Division Multiplexing)optical fiber. Finally the synchronization path carries both synchronization messages and scheduling messages between the edges and the core router over same optical link. The synchronization and scheduling messages will normally be on the control path, but any other suitable path may be employed to transmit such messages.

Figure 2:
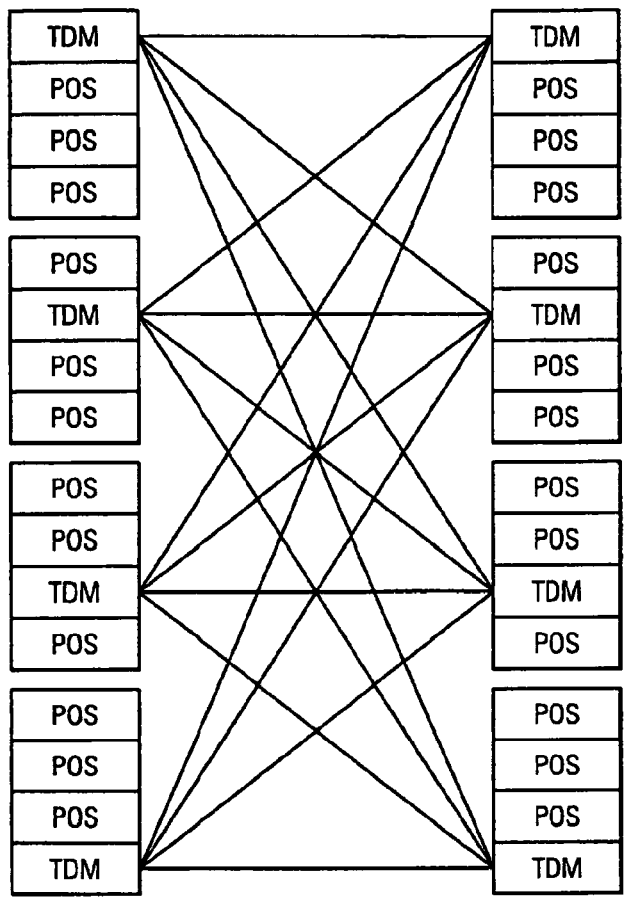
FIG. 2 depicts potential TDM connections of the present invention.

FIG. 2 illustrates a potential mix of port cards for use by the core router 100 in a preferred embodiment. Each TDM interface is assumed to support four OC-12 TDM streams that are capable of being dynamically established and removed. FIG. 2 further depicts combinations of TDM connections that could occur. Each PoS port can support any mix of MPLS, DS-1, DS-2, and BE traffic. The traffic is managed in separate input queues at the ingress ports 102.

In one embodiment of the present invention the control path 116 and the synchronization path 120 are collapsed into a single Fast Ethernet path (100 Megabits per second) connecting the core router 100, the edges and all ports. The network can be implemented using a single Ethernet switch, which implies that the control and scheduling messages share the same bandwidth, resulting in effectively two distinct paths between the edges and the core router—the data path and the messaging path.

Figure 3:
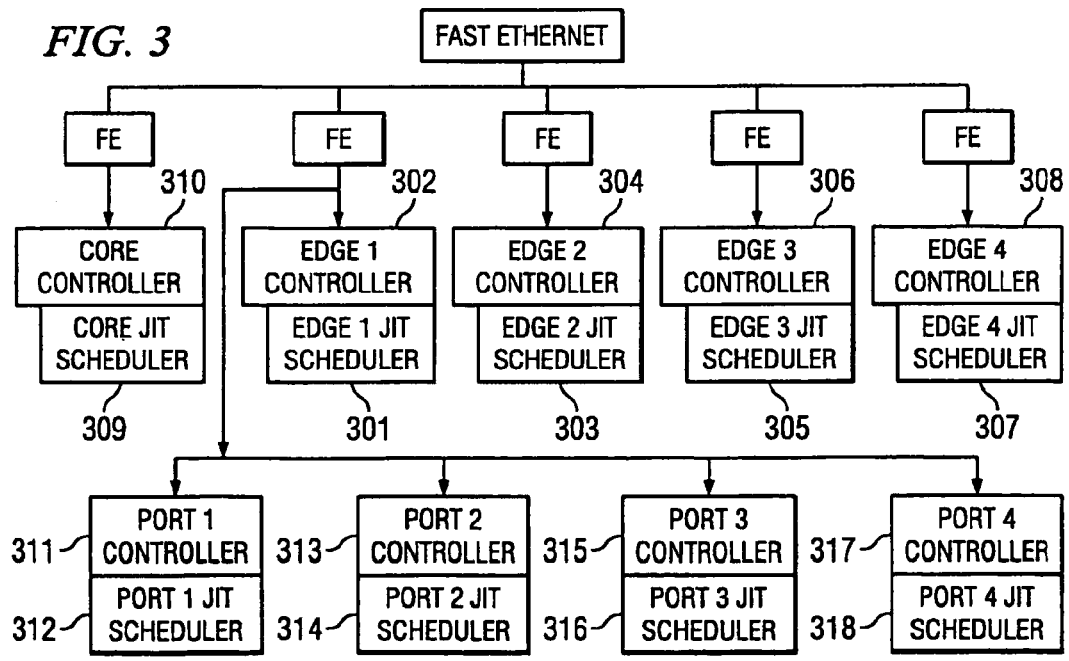
FIG. 3 depicts a schematic diagram of a core scheduler section of the core router of the present invention.

The functionality of the core router scheduler 100 is distributed to at least three separate levels in one embodiment of the present invention. In an alternate embodiment a single level core router scheduler 100 is employed. FIG. 3 displays a core scheduler 300 included in a control cluster 310 in the core router 100; an edge scheduler 301, 303, 305 and 307 included in the edge controller 302, 304, 306 and 308 for each edge; and the port scheduler 312, 314, 316 and 318 residing in each ingress port 311, 313, 315 and 317. The core JIT scheduler 610 is responsible for determining and distributing a non-blocking (i.e. non-edge-blocking) schedule for the entire system. Each schedule defines a series of connections between all ingress and egress ports. The series of connections is referred to as a frame, and is repeated until a new schedule is adopted. Referring back to FIG. 1, lines 120, 126 and 128 represent the links connecting the different levels of the scheduler. As is described in detail later, the links are capable of carrying a variety of scheduling messages between the various components of the scheduler. These connections may be better understood by referring to FIG. 3 which illustrates control and messaging architecture for one embodiment of the present invention.

One embodiment of the present invention employs a heuristic scheduling algorithm which is described in detail later. In this embodiment a dynamic schedule is generated as frequently as is practicable, which is sensitive to the various quality of service (QoS) classes for packetized data. Concurrently, the scheduler supports the establishment and operation of TDM traffic streams that have extremely stringent latency requirements. As will be described later in detail, the ports and edges send to the core scheduler 100 a measure of sufficiency (called a "sufficiency report message") of the current schedule in place. When this measure indicates that the current schedule is no longer adequate, a new schedule is computed and distributed to the port schedulers through intermediate edge schedulers. The new schedule is concurrently distributed to core router fabric 130. After acknowledgement of receipt of the new schedules the entire system will switch to the new schedule pattern in sync with a frame boundary.

Figure 4:
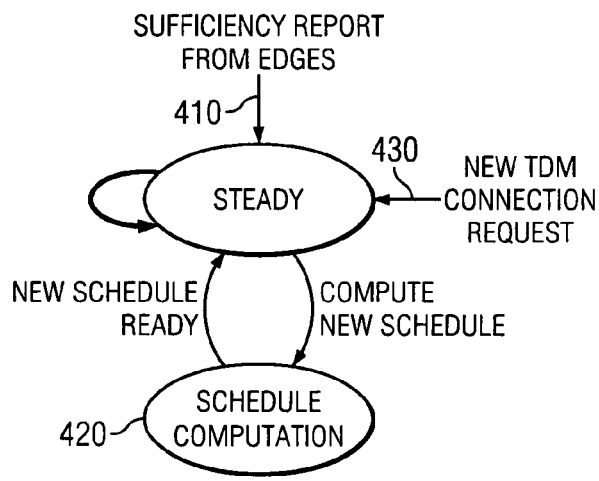
FIG. 4 depicts a high level state transitions for a two state scheduler operation of the present invention.
Figure 5:
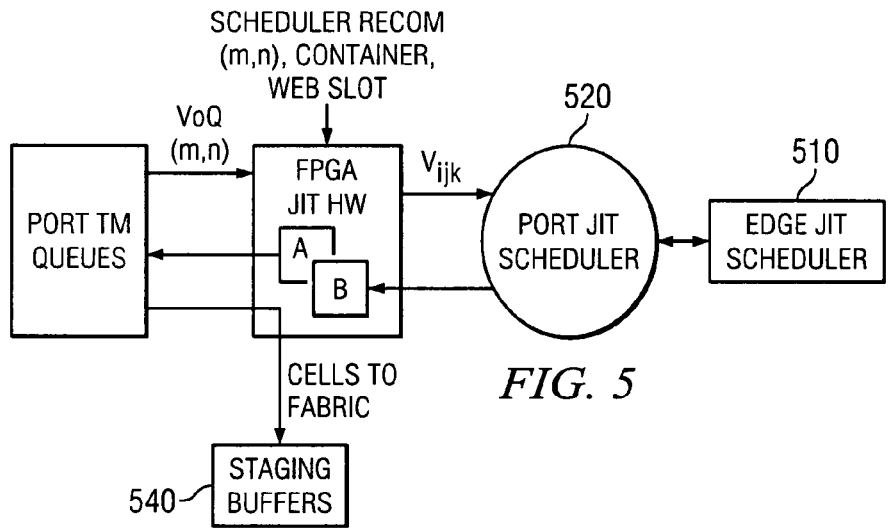
FIG. 5 is a schematic diagram of a FPGA JIT hardware device for maintaining current system schedule of the present invention.

FIG. 4 is a schematic diagram of high level state transitions of a two state scheduler operation. In this embodiment of the present invention a steady state schedule repeatedly runs a schedule pattern and the pattern is repeated as long as the core JIT scheduler 610 determines that the performance of the schedule remains sufficient. The core JIT scheduler 610 determines sufficiency by evaluating the data in the sufficiency reports 410 received from the edge JIT schedulers 510, as shown in FIG. 5. When the core JIT scheduler 610 determines that a new schedule is needed, it triggers a transition to the scheduling computation state 420. Transition to the scheduling computation state 420 can also be triggered by a TDM connection request message 430 coming from the core control complex.

In the steady state mode in one embodiment, the schedule is maintained in a hardware device that has one or more storage memories. The schematic implementation of this hardware is shown in FIG. 5 for the port control card and FIG. 6 for the core optical matrix control card. In FIG. 5 an FPGA embodiment hardware is depicted, including two storage areas 'A' and 'B' to scheduler recommendations. Only one of the scheduler recommendations are active at any one time in this embodiment. The other area is available to receive the new schedule recommendation from the port JIT scheduler 520. The FPGA hardware in the port card also collects statistics such as VoQ (m,n) of the traffic manager and computes $V_{ijk}$ parameters, wherein $V_{ijk}$ represents the value, in Quality of service units, of sending the k-to container from ingress port i to egress port j.

Figure 6:
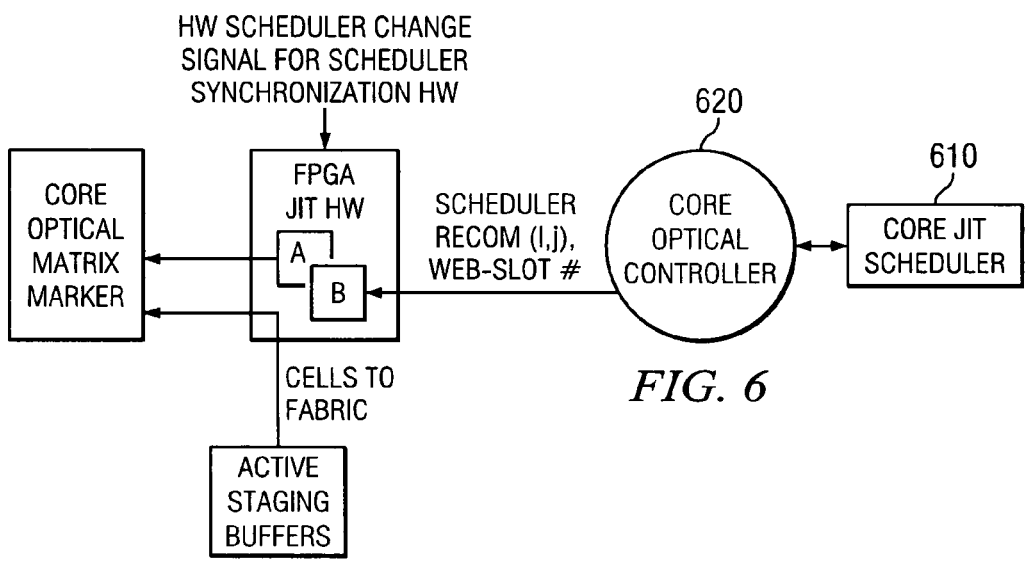
FIG. 6 is a schematic implementation of the optical matrix core control scheduler of the present invention.

FIG. 6 depicts a schematic implementation of the optical matrix core control scheduler and discloses two storage units for schedule recommendation, although one memory device may be employed. At any time only one storage unit need be active and the system will use recommendations from the active unit. The new schedule is transferred to the non-active plane by control plane messages.

The schedule change over is triggered by the core scheduler synchronization hardware signal 535. As mentioned, the scheduler synchronization plane is implemented via synchronization hardware, which will synchronize all the packet transfers from the different queues and through the core optical matrix. The synchronization hardware is triggered by the control message from the core JIT scheduler 610.

The JIT schedule recommendations are sent from the core JIT scheduler 610 in a form of control messages to the edge JIT schedulers and core optical controllers. The FPGA implementation of FIGS. 5 and 6 store these recommendations for scheduling. At the appropriate synchronization time hardware transfers the schedule from one memory plane to another. This transfer will immediately activate the new schedule in the entire system and ensures system integrity. Implementation of interfacing of the scheduler messages to the different system hardware may be accomplished in multiple ways. The schematic views shown are for illustrative purposes only and are not meant to limit the present invention to these illustrations/embodiments only.

Staging buffers 540 at the ingress edge unit 104 transfers containers from a traffic manager (TM) and stores them until a next scheduled cycle. This mechanism prevents changing the scheduler from the old to the new schedule simultaneously at ingress edge units, optical core matrix and egress edge unit. The core schedule synchronization hardware changes the Ingress edge unit to new schedule first. In the following waveslot (i.e. cycle), it changes the schedule of the optical core matrix. In the next or a subsequent web slot, the staging buffer changes the egress port schedule.

The core JIT scheduler 610, which is a integral component of the present invention, is capable of performing multiple functions including:

(1) determination of the instant of computing the new schedule system;

(2) collection of the demand reports from the edge JT scheduler to generate the network traffic view of the system before computing the new schedule;

(3) computation of the new schedule;

(4) segmentation of the global scheduler computation into edge specific schedule recommendation;

(5) transfer to schedule to the various edge units and optical core matrix controller;

(6) collection of the ready messages from the various scheduling units (edges and core); and (7) informing the synchronization hardware that schedule is now ready.

The internal functioning of the scheduler plane is later described in detail as well as the scheduler messaging and scheduler message formats.

As depicted in FIG. 4, the scheduler operates in one of two states. It is presumed that the system is in "steady state" most of the time. Once the system transitions to the scheduler computation state, the lifetime of that state is not more than a few JIT cycle times. Switching in the core router 100 is based in the deployment of a dynamic scheduler. The core router 100 is assumed to always have an active schedule, which consists of a list of connections that are available to each port. As a new schedule is being prepared, the currently active schedule remains in place. The JIT Core Scheduler uses the schedule to send data across the switch fabric, monitors the schedule to see if it is still adequate, and calculates a new schedule when the old one is no longer sufficient.

Scheduling activities are distributed over multiple levels defining the scheduling system. In one embodiment three levels are employed: the core JIT scheduler 610, which creates the schedule and co-ordinates the other layers; the edge JIT scheduler 510 (one in each edge), which co-ordinates between the core the ports; and the port JIT scheduler 520 (one in each port card), to handle the individual port decisions.

In addition to scheduling duties, the edge JIT scheduler 510 serves as the messaging interface between the edge components and the core components. The port JIT scheduler 520 and the TWDM interface with the edge JIT scheduler 510 to exchange reports and schedules. The edge JIT scheduler 510 interfaces with the core JIT scheduler 610 to exchange aggregated reports and edge level schedules.

The following subsystems further facilitate messaging translation between subsystems: a port Traffic Manager (TM) queues all the incoming packets based on destination egress port and QoS (there are four QoS classes); a Core Cluster Controller performs application-processing functions; and a Core optical matrix controller 620 controls cross-point operations of the core optical matrix; and a Core synchronization Unit synchronizes the scheduler timing operation and controls the scheduler change operation.

Figure 7:
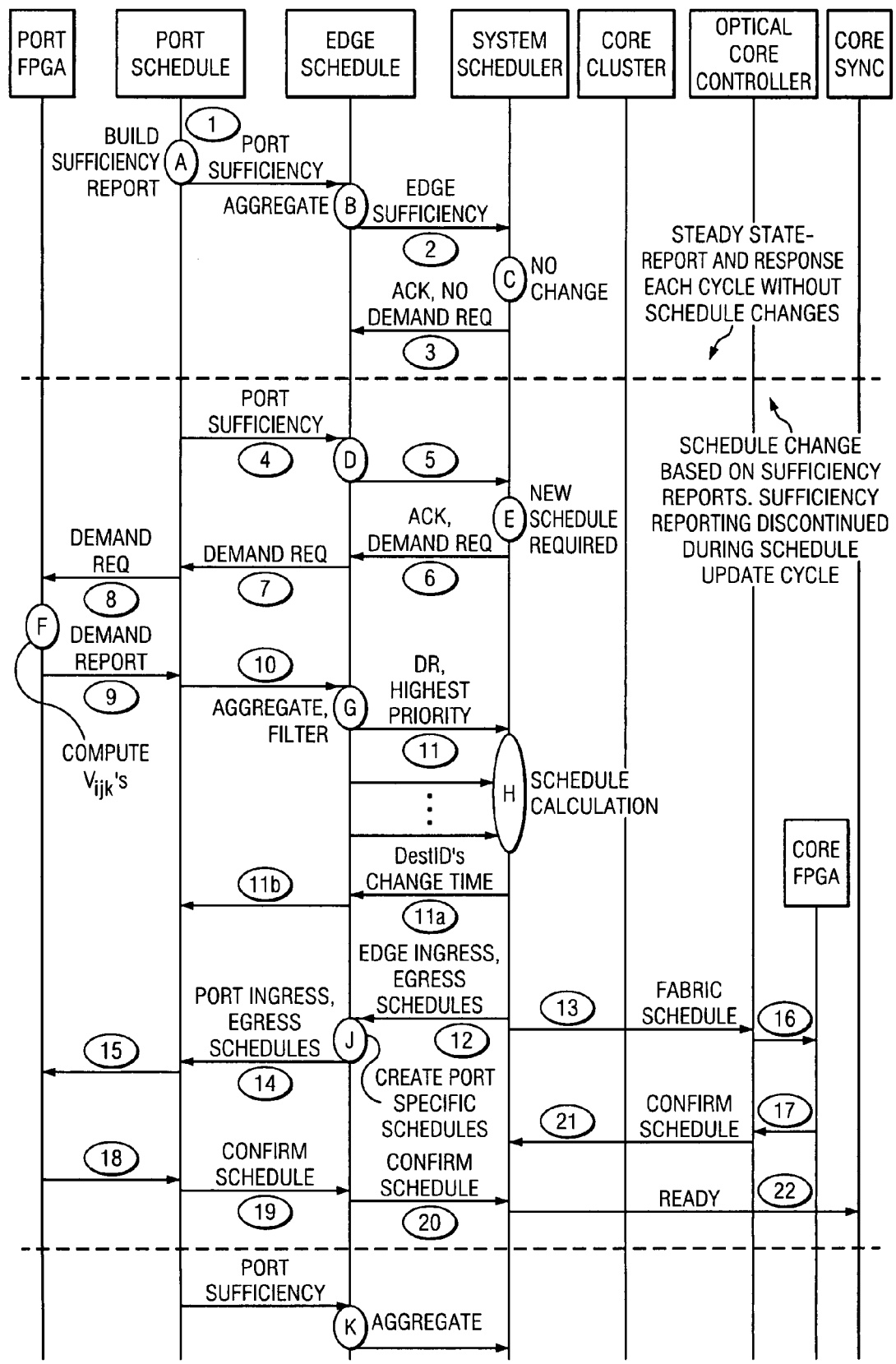
FIG. 7 is a messaging sequencing diagram for effecting a transition to a new state for PoS traffic of the present invention.
Figure 8:
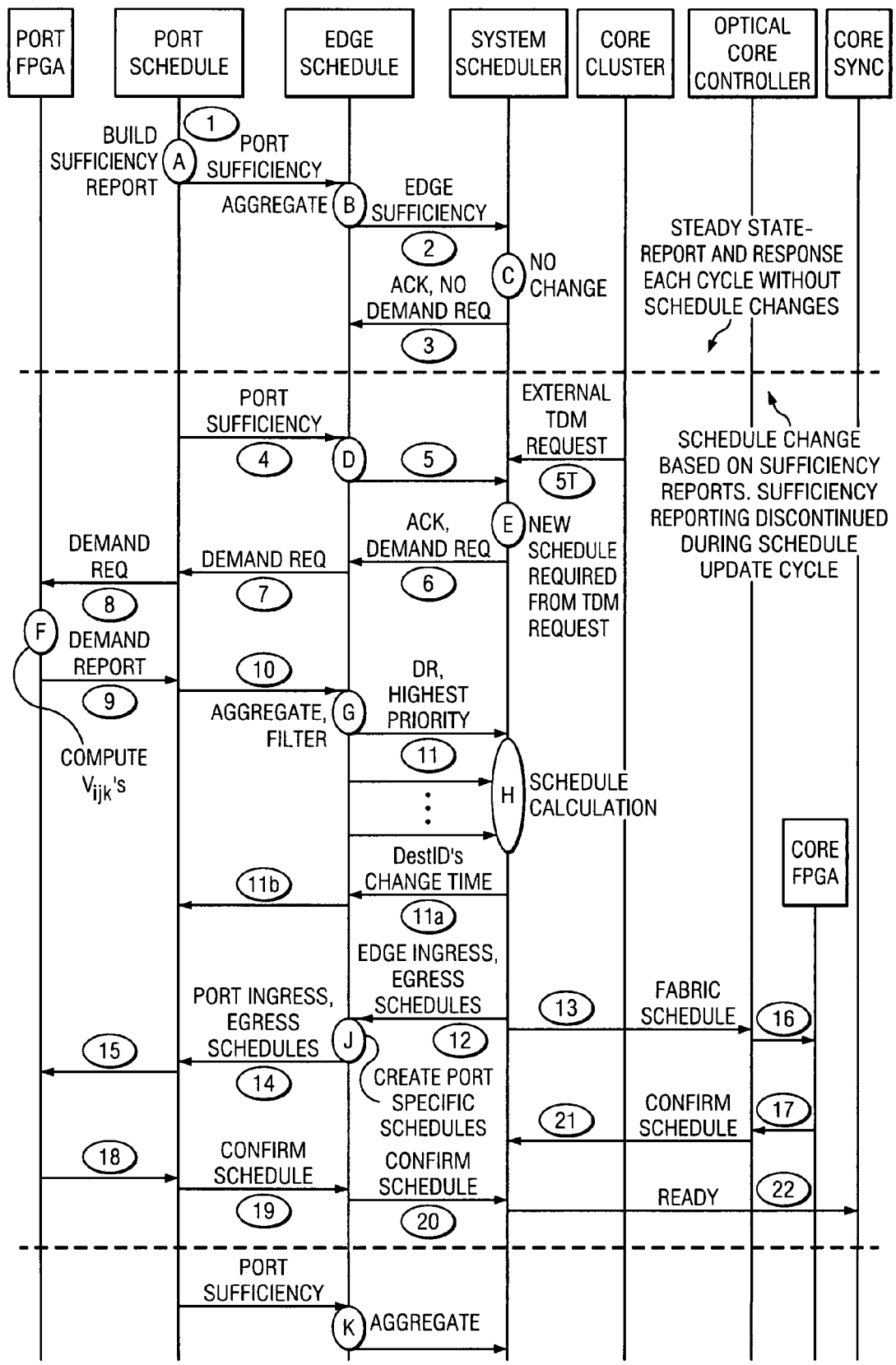
FIG. 8 is a messaging sequencing diagram for effecting a transition to a new state for TDM traffic of the present invention.

The messaging between these subsystems is shown in FIG. 7 for schedule updates based on PoS type traffic demands and FIG. 8 for TDM connection demands. As detailed in FIG. 7, during steady state operation, each of the ports reports how its traffic is being served by sending sufficiency reports to the edge JIT scheduler 510 (Message-1). The edge JIT scheduler aggregates these reports and sends a sufficiency report to the core JIT scheduler 610 (Message-2). These reports are nominally sent once per JIT cycle.

The core JIT scheduler 610 then accepts the sufficiency reports of the edge JIT scheduler 510 and evaluates the reports. At some point, triggered by a set of sufficiency reports, the core JIT scheduler 610 determines that the change in schedule is required and enters into the schedule computation state. The core JIT scheduler 610 sends a message to each edge JIT scheduler 510 requesting a demand report (Message-6). The edge JIT scheduler transfers the message to the port JIT scheduler 520 (Message-7). Each port JIT scheduler 520 sends the request to the port FPGA unit 530 to initiate $V_{ijk}$ computations for the port (Message-8), wherein $V_{ijk}$ is proportional to the gain achieved by sending a k-th container from ingress port i to egress port j in Quality of service units. The port FPGA sends the $V_{ijk}$ values to the port JIT scheduler 520 (Message-9). Port demand reports are sent to the edge JIT scheduler 510 (Message 10) where they are filtered and aggregated before being sent to the core JIT scheduler 610 (Message-11). Message-11 is sent in multiple bundles so that the core JIT scheduler can start the calculations on receipt of the first message bundle from each edge. The parallelism created by this operation reduces the schedule calculation time.

As previously stated, the system scheduler begins calculating a new schedule based on the demand reports. Once the system scheduler has decided what flows are served, but prior to the actual allocation of timeslots, it sends a message to the edges to inform them that a new schedule is put into service in the future and indicates the flows to be served (Message 11a and 11b). This advance notice enables the ports to gracefully close off flows, which are to be terminated.

Figure 9:
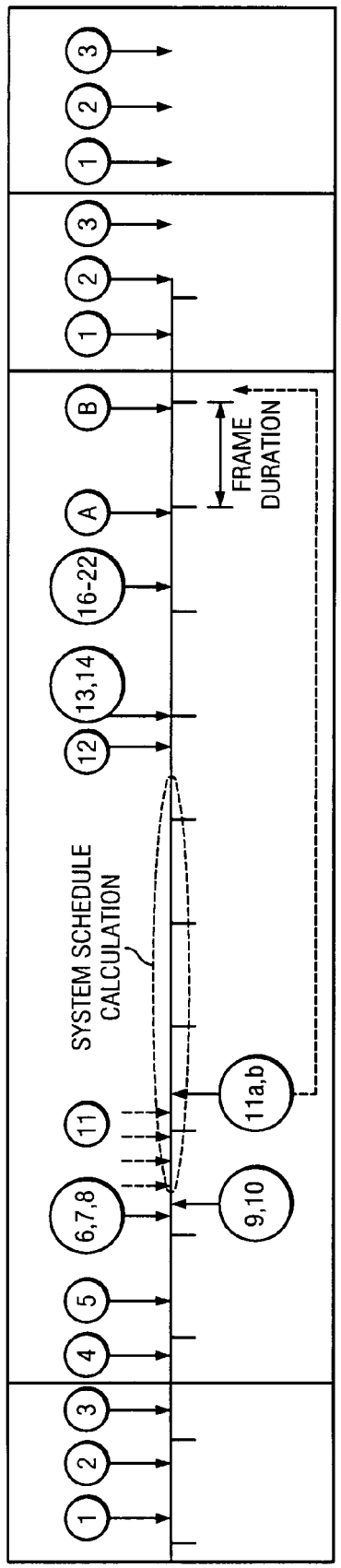
FIG. 9 illustrates sequencing of messages for effecting the transition to a new state of the present invention.

The timing of the transition to the new schedule is dictated by a synchronization-timing signal, the sequencing of messages to effect the transition are illustrated in FIG. 9. Coordination of the prediction by the system scheduler and the mechanism issuing the signal to change to a new schedule is required and the closer the predicted and the actual transition time, the better. On completion of the scheduling computation, the core JIT scheduler 610 communicates the new schedule to all the edge JIT schedulers and the core optical matrix controller 620 (Message-12 & 13), as shown in FIG. 7. The edge JIT scheduler 510 on receipt of this message transfers the port schedules to the respective port JIT scheduler 520s (Message-14). The port JIT scheduler 520 transfers the schedule recommendation to the port FPGA hardware 530 and thus loads the schedule into the inactive part of the port scheduling memory (Message-15).

Similarly, the core optical matrix controller 620 loads the schedule recommendation into the inactive part of the FPGA for the schedule change (Message 16). The port FPGA 530 and the optical matrix FPGA sends back a schedule ready message to the port JIT controller and optical matrix controller (Message-17 & 18). The schedule ready message is then sent back to the core JIT scheduler 610 by the edge JIT scheduler and core optical matrix controller 620 (Messages-19, 20 & 21). The core JIT scheduler, on receipt of all the ready messages from all the subsystems, sends the final ready message to the core synchronization unit module. At the appropriate instant, the core synchronization module changes the scheduler. The ports then begin using the new schedule to fill the flow buffers. Slightly more than a frame later, the TWDM begins feeding containers from edge frame buffer to the core router 100 according to the new frame schedule.

Returning once again to the steady state operation state, during this phase each of the ports determines and reports how well its traffic is being served by sending sufficiency reports to the edge JIT scheduler 510. The edge JIT scheduler 510 aggregates these reports and sends a sufficiency report to the core JIT scheduler 610. The reports are nominally sent once per frame.

During the reporting cycle as shown in FIG. 10, the core JIT scheduler 610 determines whether a new schedule is required. This process is as follows: at step 1010 the process of evaluation that the core JIT scheduler 610 performs begins. Control then passes to step 1020 wherein sufficiency reports are received from the edges. If a new report is not received then the last received report is utilized. At step 1030 an error message is sent to each port that failed to submit a report. Control then passes to step 1040 wherein all received reports are compiled. Step 1050 performs a comparison of the current schedule to a total value ideal value for each port. At step 1060 a determination is made as to whether a new schedule is needed. If the determination is yes the process branches to step 1070 wherein a demand report is requested from all edges simultaneously. If the determination is that a new schedule is not needed the processes branches to step 1080 which sends 'no change' messages top each edge simultaneously. Steps 1070 and 1080 once performed both pass control of the process on to step 1090 which terminates the process and resets the algorithm for the next sampling.

Viewing the above process from a hardware perspective, the core JIT scheduler 610 evaluates the sufficiency reports and the core JIT scheduler requests all of the edges to generate a demand report.

The edge JIT scheduler 510 requests all of its ports to generate a demand report and the port JIT scheduler 520 requests the traffic manager (TM) to generate a demand report. The TM provides a demand report to the port JIT scheduler 520. Port JIT scheduler then sends demand reports to the edge JIT scheduler 510 and the edge JIT scheduler filters and aggregates the port demand reports and forwards edge demand reports to the core JIT scheduler 610. The edge JIT scheduler 510 sends a series of demand reports to the core JIT scheduler, wherein the filtering process selects the most important containers from each port and reports on them immediately and reports on lesser important containers in subsequent messages. This reduces the demand report message size and allows the core JIT scheduler 610 to start generating a new schedule.

The core JIT scheduler 610 notifies the edge JIT schedulers which notify the port JIT scheduler 520 that a new schedule is coming, informing them of what flows are supported, and estimating when the new schedule will take effect. This advance notice enables the ports to close flows in and efficient and orderly manner that are to be terminated.

Core JIT scheduler 610 then sends each edge JIT scheduler 510 its new schedule and the edge JIT scheduler 510 extracts those components of the edge schedule needed by each port and sends them to the respective port JIT scheduler 520, wherein the port JIT scheduler 520 delivers the schedule to the TM.

The above process is illustrated in FIG. 11 and will be briefly described at this time. The process starts a step 1110. At step 1120 demand reports from the edges are received. At step 1130 port-to-port connections for a complete JIT cycle are generated. Control then passes to step 1140 wherein a Heads up message is sent to each edge containing the determined port-to-port connections. A port-to-port frame matrix reduction to an edge-to-edge frame matrix is then performed at step 1150. A peeling process is performed at step 1160 to convert the port-to-port from matrix into numerous edge-to-edge timeslot matrices. At step 1170 edge schedules are created from the edge-to-edge timeslot matrices and port-to-port connections. Control then passes to step 1180 wherein edge schedules are sent to the edges. At step 1190 a core schedule is sent to the optical core controller 620 and the process then proceeds to step 1195 and terminates this process until a demand for reports from the edges is requested.

Turning now to the handling of TDM traffic, the message flow for a schedule change due to a request for a new TDM flow as depicted in FIG. 8 is nearly identical to that described above. The core cluster receives a TDM request and determines that it can and should be supported and it notifies the system scheduler with message 5T. From that point, the message flow is the same as the PoS starting at message 6.

The sequence of messages are shown against a time-line in FIG. 9. A fixed estimate based on knowledge of the schedule processing delays is used to predict the time that a new schedule will take effect. As described above, the core JIT scheduler 610 will report this delay estimate when it reports which flows are going to be serviced.

A discussion of the functional logic of the scheduler at each of the JIT scheduler subsystems will now be described in detail. Numerous designs for a dynamic schedule have been considered such as a statistical, catalog-driven algorithm, an optimization algorithm, and a heuristic 'greedy' algorithm. Each of these algorithms is briefly described below. The present invention contemplates and supports any algorithm or process for creating a new schedule that a user may adopt as long as the computations can be performed in a timely manner.

The statistical algorithm builds over time a catalog of schedules for typical traffic on a switch. It compares current traffic levels to the traffic levels used to generate the cataloged schedules. When it finds a close match in demand, it uses the one of the cataloged schedules that most closely matches the demand. This algorithm has some limitations, one is that it requires that the problem be solved in advance a number of times to create a catalog, so it does not solve the problem of how to calculate the initial schedules, thus requiring an initial schedule to be implemented. Another is that it assumes a reasonably long run time under real traffic conditions before the catalog is particularly useful, and so may be of limited use for long runs.

The optimization algorithm dynamically calculates a new schedule by employing a linear programming technique. It employs $V_{ijk}$ to represent the value, in Quality of service units, of sending the k-th container from ingress port i to egress port j. Then the edge and port and blocking restrictions can be represented mathematically as constraints of the model. The sum of the $V_{ijk}$ values for the containers sent over the course of one cycle can be maximized as an objective function. This guarantees the best possible schedule for the current demand set. Unfortunately, the linear programming technique is computationally intensive and presents time constraints issues.

The heuristic algorithm uses the same data as the linear programming model, but rather than calculating the global maximum, it automatically accepts the highest priority traffic. It constructs a schedule that includes the highest-valued containers possible, working down through the priority levels until the schedule is complete. Note that this is not the same as choosing the highest-valued overall schedule. The heuristic algorithm includes the highest-valued containers possible and provides a very good schedule quickly to handle the current traffic conditions.

The remainder of this disclosure will provide a detailed description of the logic and hardware utilize for one embodiment of the present invention employing the Heuristic Algorithm and the associated Peeling Algorithm.

The core JIT scheduler 610 makes all global scheduling decisions for the core router 100. It determines when a new schedule is needed, calculates the new schedule, and sends the schedule to the edge JIT schedulers when it is finished.

During the steady state, the core JIT scheduler 610 receives sufficiency reports each frame, from each edge. With this data, the core JIT scheduler determines if the current schedule is sufficient. This is a simple calculation, much quicker and easier than determining what a new schedule should be. When the core JIT scheduler determines that a new schedule is needed, it then requests demand reports from the edges, based on the status of the queues in each port. After receiving the demand reports, the core JIT scheduler 610 calculates a global schedule based on the composite demand data. The new schedule is then sent to the edges for delivery to the ports, and the changeover to the new schedule is co-coordinated on a global basis. At the same time the new schedule is sent to the edges, it is also sent to the core fabric 100 to facilitate the core switching requirements.

The core JIT scheduler 610 receives the sufficiency reports and determines whether the current schedule is sufficient. Each port sends a total $M_i$, which is a sum of the values of the best 16 highest priority containers waiting at the port, and the total R which is a sum of the 16 containers actually sent. Note that the best schedule for the system as a whole is not necessarily the sum of the schedules represented by the various $M_i$'s. Equation 1, as follows, represents a sum over the entire system of the differences $M_iR_i$.

$$\Sigma_i(M_iR_i) > \text{Max}_1 \qquad (\text{EQ. 1})$$

If this quantity exceeds a predetermined threshold, the core JIT scheduler 610 requests current demand data in preparation for computing a new schedule. Furthermore, if the quantity is consistently rising, as defined by Equation 2, this indicates that the current schedule is not keeping up with the best incoming traffic and, therefore, also triggers the demand for a new schedule. Equation 2 is a follows:

$$d/dt[\Sigma_i(M_iR_i)] > \text{Max}_2 \qquad (\text{EQ. 2})$$

Wherein $\text{Max}_1$ and $\text{Max}_2$ values are predetermined, but may be redefined either by the system or a network administrator. Note that for the Eq. 2, the core JIT scheduler 610 must store the value of $\Sigma_i(M_iR_i)$ over the course of several JIT cycles, or the last value plus the number of successive increases.

The core JIT scheduler 610 receives all demand reports and employs the heuristic algorithm to determine which port-to-port connections are made over the course of one JIT cycle.

The port-to port connections are then sent to the edges, along with a Heads up message announcing the expected number of frames left for the old schedule. The port-to-port matrix is reduced to an edge-to-edge matrix, representing the edge-to-edge connections made over an entire JIT cycle. The peeling process is then used to split these connections into individual timeslots. The Peeling Algorithm then combines the port-to-port connections with the edge-to-edge timeslot connections to create a full port-to-port timeslot schedule. Each edge is sent its portion of the overall schedule, and the core optical core controller is sent the full list of connections.

The core JIT scheduler receives ready messages from each edge, and from the optical core controller. When all the ready messages are received, it informs a Core sync, which coordinates the schedule as diagramed in FIG. 12. The edge JIT scheduler 510 coordinates the communication between the core JIT scheduler 610 and the port JIT scheduler 520, and sends the edge schedule to the TWDM controller.

During steady state operation, the edge receives port sufficiency reports, compiles them, and sends them to the core JIT scheduler 610. When the transition state is reached, the edge is informed of this event by receiving a demand request message, which it passes down to its ports. The port demand messages are sent to the edges, and the edge JIT scheduler 510 compiles them into smaller messages, which are sent in sequence to the core JIT scheduler 610. When the edge schedule message is received, it is forwarded to TWDM Controller 135 (see FIG. 1), and also creates port schedules to send to the edges.

During the steady state, the edge JIT scheduler 510 receives the port sufficiency reports every JIT cycle, and produce an edge sufficiency report and then sends this edge sufficiency report to the core, as diagramed in FIG. 13. This process requires no processing by the edge except compiling the port data.

The edge receives a demand request from the core and passes the request to each of its ports. The core sends this request when it determines that a new schedule is necessary. The flow is shown in FIG. 14.

When the port demand reports have been received by the edge JIT scheduler 510, the the edge JIT scheduler sorts them by $V_{ijk}$, and sends them in groups of 16 from each port up to the core JIT scheduler 610, as illustrated in FIG. 15.

During the report distribution, the core JIT scheduler 610 sends an ingress edge schedule and an egress edge schedule to the edge JIT scheduler 510. The edge JIT scheduler then creates four separate port reports and sends an ingress schedule and an egress schedule to each port JIT scheduler 520. Then the edge JIT scheduler 510 sends the schedules to the TWDM, as shown in FIG. 16.

A port receives incoming packets, determines their character, and assigns them into queues based on their egress port and Quality of Service. The port JIT scheduler 510 allocates flow buffers for all established TDM connections, then other flow buffers chosen from among the PoS input queues based on the current schedule. It identifies the highest priority traffic and moves this traffic to the staging flow buffer. The port JIT scheduler 510 tracks the value of the containers it sends each frame, as well as the value of the best 16 containers it could have sent. Based on this input from all ports, the core JIT scheduler 610 determines whether a new schedule is needed. When a new schedule is called for, the port JIT scheduler 510 collects data from the QoS queues and uses this data to generate demand reports for the core JIT scheduler 610. When the new schedule is received, the port JIT scheduler sends it to the TM. The TM then uses the schedule that it receives from the core JIT scheduler 610 to schedule containers.

Figure 17:
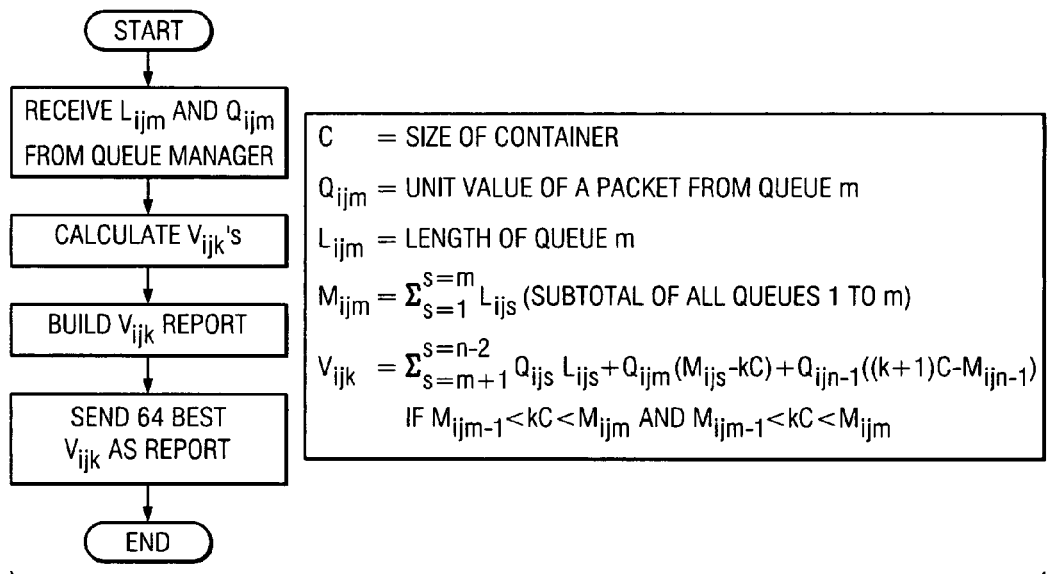
FIG. 17 is an edge demand request flow diagram of one embodiment of the present invention.

During each JIT cycle, the port scheduler compiles a list of the top 16 containers worth of data in its queues. It does this by talking the top 16 $V_{ijk}$ values. The $M_i$ of the top 16 containers of data are summed as well as the value, $R_i$, of the containers that are actually sent. These values are sent to the respective edges. When the port JIT receives the Demand Request, it calculates all $V_{ijk}$ values from $L_m$ (length of queue m) and $Q_m$ (unit value of packet from queue m), and sends the top 64 values to the edge. FIG. 17 is a flow diagram representing this process.

The port receives an ingress and egress schedule from the edge scheduler. These schedules may be padded with zeroes if there are unused timeslots present and sent to the FPGA. Depending upon the relative costs of port processing and messaging, the schedules should be sent from the edge in that larger format. For use by silicon processing, the schedule should consider each timeslot in the JIT cycle, even when the value of timeslots are not allocated to the port.

When the FPGA 530 receives the schedule it puts it in the inactive area. It sends a Ready Message up through the port JIT scheduler 520 and the edge JIT scheduler 510 to the core JIT scheduler 610 when it is ready to switch schedules. Then it receives a ready back message verifying the schedule change time. The ingress schedule is put into active service when it is time to start allocating containers to the buffer according to the new schedule. Then, when the containers are actually ready to cross the switch fabric, the egress schedule is made active.

The port demand message is a list of priority demands, in the form of a list of potential containers, with egress port and value of the container ($V_{ijk}$).

When the edge receives the port messages described above, it builds a message that has the top 16 container reports from every port and ships it to the core JIT scheduler 610 to begin creating a schedule. It immediately creates a second message with the next 16 most important containers from each port. When the heuristic algorithm is finished, the port-to-port connections are known, so they can be sent down to the ports during the peeling process. These are unordered connections, and the message serves two purposes to let the port know which flows will soon be cut off, and to give an estimate on the last cycle that will use the old schedule. With this information, the port will cut off flows appropriately. It should be noted that the cut off time is an estimate, the actual cut off time is determined after every port has acknowledged receiving the new schedule.

The edge must pass each port its own portion of the Heads up message, to let the port know which flows will soon be cut off, and to give an estimate on the last cycle that will use the old schedule. With this information, the port will cut off flows at the appropriate time and the appropriate manner to avoid data loss and system synchronization. The Edge Heads Up Message is sent by the core JIT scheduler 610 to give the new schedule to the edge. It is also sent directly from the edge JIT scheduler 510 to the TWDM Controller.

The Ingress scheduler should be capable of identifying the destination port (Egress Port) from among all ports. Likewise, for the Egress scheduler, the source port (Ingress port) must be identifiable from among all egress ports.

When the edge receives the Edge Demand Message giving it the new schedule, it creates a Port Demand Message for each port. If one wishes to send it in the form that is used by the FPGA, then there is a need to send all 64 timeslots, with zeroes for the timeslots that are not used by that port. However, the timeslot field would then be implicit.

The Scheduler's purpose is to provide a schedule that will service the highest priority traffic available. Since traffic changes over time, the schedule must also change. The heuristic algorithm is being used to determine the new schedule. This embodiment utilizes the heuristic algorithm, but there are numerous other algorithms that would come within the scope of the present invention. The scheduler determines each JIT cycle whether a new schedule might be needed. If so, it asks for a report on the traffic demands on each port. When it receives the reports, it knows what value there is in making a particular port-to-port connection. The heuristic algorithm uses these values to construct a schedule that includes the highest-valued containers possible. The result of the heuristic might not yield the ideal schedule, but it will be close to an ideal schedule, if not ideal, and it will probably include some of the highest-valued containers possible.

The heuristic algorithm takes the demand reports from the port to determine a high-priority schedule. In the first step, the 16 highest priority containers from each port are taken as the first approximation schedule. Note that this begins with the TDM containers, which are always the highest priority. This gives an average of 16 containers per egress port as well, but some ports could have more than 16, while others have less.

For each port with more than 16 containers, retain only the top 16. Now all ingress and egress ports have 16 or fewer containers assigned, and some have exactly 16. Every ingress or egress port with exactly 16 containers is frozen no more are added or subtracted. This represents the first iteration of the algorithm. At the end of each iteration, a check is performed to determine if all ports have 16 containers assigned. If so, the schedule is complete. If not, the process is run subsequent iterations until the schedule is complete. From this point there is only added enough new containers to the ingress edges to bring the total number of containers up to 16. The process also ignores containers going to frozen egress edges.

Figure 18:
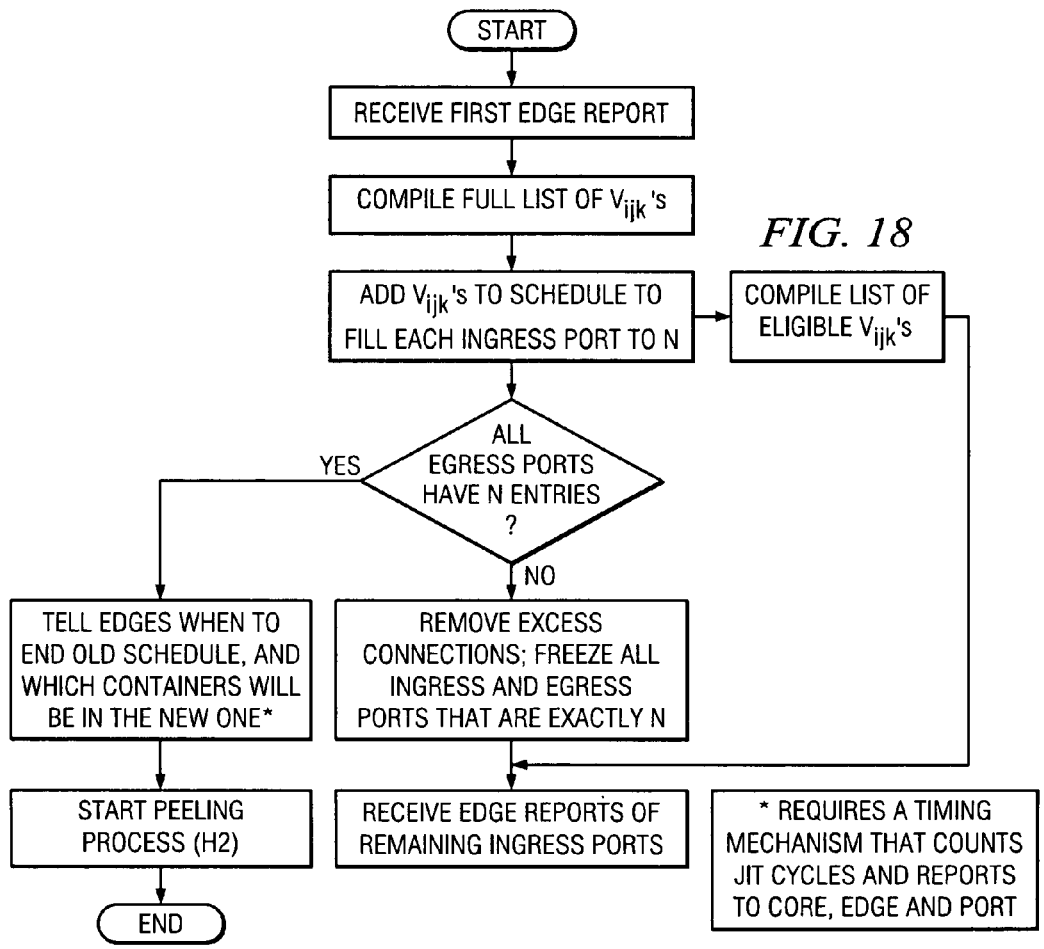
FIG. 18 is a flow diagram of a heuristic algorithm of one embodiment of the present invention.

If there is only one unfrozen egress port, or one unfrozen ingress port, then all remaining containers must be assigned to that port. Also, if the available containers are exhausted before the schedule is completed, then empty containers are be sent, and they may be assigned arbitrarily. The algorithm is subject to the law of diminishing returns. After very few iterations, there is little value to continuing, and it might be more valuable to simply assign the last few containers arbitrarily. The flowchart for this algorithm is found in FIG. 18.

Figure 19:
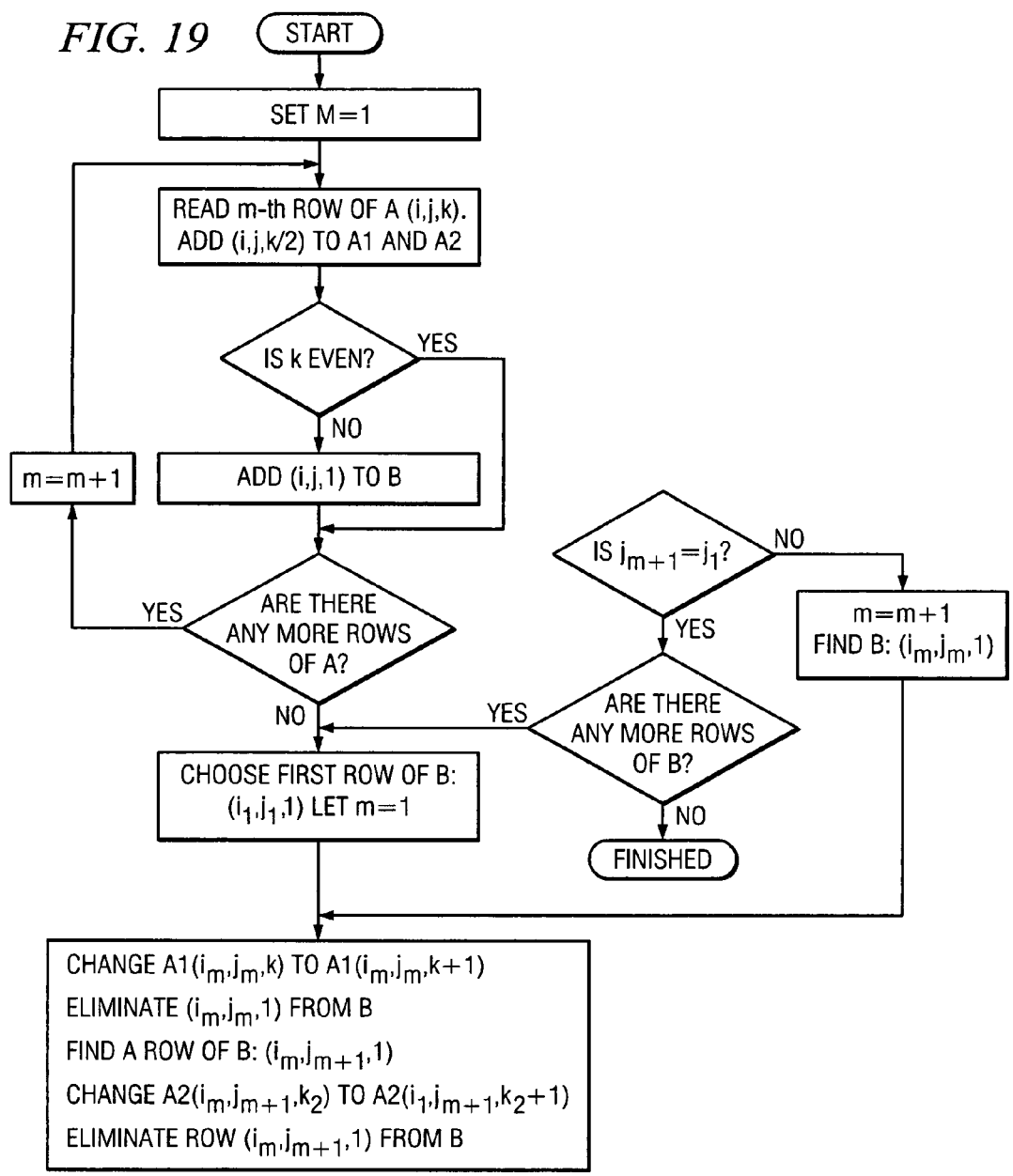
FIG. 19 is a peeling process flow diagram of one embodiment of the present invention.

The heuristic algorithm creates a schedule of all port-to-port connections to be made in a JIT cycle. It does not, however, consider the edge-to-edge restrictions or the need to separate the connections into timeslots. The peeling algorithm reduces the overall JIT cycle schedule into 64 timeslot schedules. A flow diagram of this process is illustrated in FIG. 19. To do this, the port-to-port schedule is first reduced to its edge-to-edge equivalent.

Figure 20:
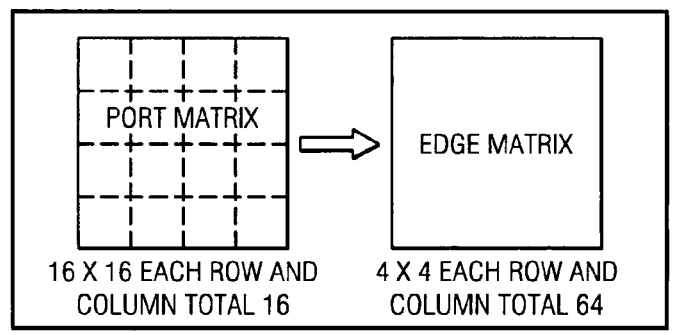
FIG. 20 depicts a reduction of a port-to-port matrix to edge-to-edge matrix utilized by the peeling process.

In a 16×16 port matrix each row and column add up to 16. By adding all the ports on an edge together, there is formed a 4×4 matrix in which each row or column adds up to 64. The peeling process splits this matrix into two matrices, with the rows and columns of each one adding up to 32. The flow chart for this process is shown in FIG. 20.

This procedure guarantees that if there are 2 or more containers in a single edge-to-to-edge connection, then there is at least one in each half of the JIT cycle. Similarly, if there are 4, at least one will appear in each quarter, and so on. These must then be mapped back onto port-to-port TDM containers to handle the TDM requirement that TDM connections be sent at exactly evenly spaced intervals. In conjunction with the peeling algorithm parallel processing could be very helpful, since by the final step, there are 32 separate and independent acts of peeling taking place.

It will be apparent to those skilled in the art that various modifications and variations can be made in the System And Method For Implementing Dynamic Scheduling Of Data In A Non-Blocking All-Optical Switching Network of the present invention and in construction of this invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A switching system comprising:
   means for maintaining a schedule for routing data through an optical matrix core;
   means for receiving and analyzing reports on the sufficiency of the schedule from peripheral devices;
   means for determining whether the schedule is adequate for current data traffic patterns, wherein if the schedule is not adequate, a new schedule is implemented;
   means for transferring the new schedule to the peripheral devices for implementation;
   means for transferring the new schedule to an optical matrix core scheduler; and
   means for implementing the new schedule as the schedule on the peripheral devices.

2. The system according to claim 1, wherein the data comprises at least one type of data selected from the group consisting of TDM and packet data.

3. The system according to claim 2, wherein the peripheral devices comprise ports.

4. A switching method, comprising:
   maintaining a schedule for routing data through an optical matrix core;
   receiving and analyzing reports from peripheral devices, wherein said reports from said peripheral devices include information on the sufficiency of the schedule;
   determining whether the schedule is adequate for current data traffic patterns, wherein if the schedule is not adequate, determining a new schedule;
   transferring the new schedule to the peripheral devices for implementation;
   transferring the new schedule to the optical matrix core scheduler; and
   implementing the new schedule as the schedule on the peripheral devices and the optical matrix core scheduler.

5. The method according to claim 4, wherein the data comprises at least one type of data selected from the group consisting of TDM and packet data.

6. The method according to claim 5, wherein the peripheral devices comprise ports.

7. The method according to claim 4, wherein the sufficiency information is based on at least one quality-of-service (QoS) criterion.

8. The method according to claim 4, further comprising:
   receiving demand-related data from said peripheral devices, the demand-related data to be used in creating the new schedule to be implemented.

9. A switching system comprising:
   a core switch fabric; and
   a core controller coupled to control the core switch fabric, the core controller comprising a system scheduler;

wherein the system scheduler is adapted to receive reports from one or more peripheral devices to be coupled for switching by the core switch fabric, the reports including information regarding the sufficiency of a current routing schedule; to determine if a current routing schedule is adequate, based on the sufficiency information; to prepare a new routing schedule based on demand-related information received from the one or more peripheral devices; and to forward information on the new routing schedule to the peripheral devices for implementation on the peripheral devices.

10. The switching system according to claim 9, wherein the system scheduler comprises:

a schedule creator/coordinator; and machine-accessible means for storing at least one schedule, the means for storing to be coupled to the schedule creator/coordinator.

11. The switching system according to claim 10, wherein the means for storing comprises a field-programmable gate array (FPGA).

12. The switching system according to claim 9, wherein the sufficiency information is based on one or more quality-of-service (QoS) criteria.

* * * * *